(12) United States Patent
Park

(10) Patent No.: US 10,850,400 B2
(45) Date of Patent: Dec. 1, 2020

(54) ROBOT WITH ANTI-NOISE SPEAKER

(71) Applicant: LG ELECTRONICS INC., Seoul (KR)

(72) Inventor: Yongjin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/566,468

(22) Filed: Sep. 10, 2019

(65) Prior Publication Data

US 2020/0001469 A1    Jan. 2, 2020

(30) Foreign Application Priority Data

Aug. 7, 2019    (KR) .................. 10-2019-0096264

(51) Int. Cl.
| | | |
|---|---|---|
| *B25J 13/00* | (2006.01) | |
| *B25J 9/00* | (2006.01) | |
| *B25J 9/16* | (2006.01) | |
| *G10K 11/178* | (2006.01) | |
| *B25J 19/02* | (2006.01) | |

(52) U.S. Cl.
CPC ........... *B25J 13/003* (2013.01); *B25J 9/0003* (2013.01); *B25J 9/161* (2013.01); *B25J 19/026* (2013.01); *G10K 11/178* (2013.01)

(58) Field of Classification Search
CPC ..................... H04R 1/02; H04R 1/025; G10K 11/178–17885; G10K 2210/106; G10K 2210/121; G10K 2210/12821; G10K 2210/129; G10K 2210/3214; G10K 2210/3219; B60N 2/80–879; B60N 2002/899
See application file for complete search history.

(56) References Cited

U.S. PATENT DOCUMENTS

| | | | | |
|---|---|---|---|---|
| 10,580,399 | B1 * | 3/2020 | Bastyr | .............. G10K 11/17825 |
| 2014/0077560 | A1 * | 3/2014 | Hirao | .................. B60N 2/2222 |
| | | | | 297/354.11 |
| 2015/0035433 | A1 * | 2/2015 | Shank | ...................... H05K 1/02 |
| | | | | 315/77 |
| 2016/0100250 | A1 * | 4/2016 | Baskin | ................... B60N 2/885 |
| | | | | 297/217.4 |
| 2018/0295443 | A1 * | 10/2018 | Takada | .................... B60R 11/02 |

OTHER PUBLICATIONS

Wikipedia, Self-driving car, published Jul. 2019, https://web.archive.org/web/20190730055958/https://en.wikipedia.org/wiki/Self-driving_car#Potential_advantages (Year: 2019).*

* cited by examiner

*Primary Examiner* — Mark Fischer

(74) *Attorney, Agent, or Firm* — Birch, Stewart, Kolasch & Birch, LLP

(57) ABSTRACT

A robot includes: a microphone assembly to which a voice is input; an accelerometer connected to a noise source; and a controller configured to control the microphone assembly, wherein the microphone assembly includes: a microphone housing formed in one surface thereof with an opening and formed therein with a space; a microphone accommodated in the space; and an anti-noise speaker accommodated in the space and spaced apart from the microphone, and the controller includes an anti-noise generator configured to output a signal corresponding to an anti-noise against the acquired noise to the anti-noise speaker.

13 Claims, 13 Drawing Sheets

ROBOT WITH ANTI-NOISE SPEAKER

CROSS-REFERENCE TO RELATED APPLICATIONS

This application claims the benefit of priority to Korean Patent Application No. 10-2019-0096264, filed in the Korean Intellectual Property Office on Aug. 7, 2019 under 35 U.S.C. 119 and/or 35 U.S.C. 120, the entire contents of which are incorporated herein by reference.

FIELD

The present invention relates to a robot.

BACKGROUND

Robots are machines that automatically process given tasks or operate with their own capabilities. The application fields of robots are generally classified into industrial robots, medical robots, aerospace robots, and underwater robots. Recently, communication robots that can communicate with humans by voices or gestures have been increasing.

The robot may be provided with a microphone capable of recognizing a voice. One example for recognizing a user voice input through a microphone is a system for efficient speech recognition by an input/output device of a robot, which is disclosed in Korean Unexamined Patent Publication No. 10-2008-0061901 (published on Jul. 3, 2008).

The speech recognition system by the input/output device of the robot includes: a microphone configured to input a user voice; a speech recognition system configured to recognize the user voice input through the microphone; and a speaker configured to output voice information recognized through the speech recognition system.

In addition, it is disclosed that the speech recognition system by the input/output device of the robot includes: an endpoint detector configured to detect only a speech section from an input signal; a feature extractor configured to extract a specific parameter, which is valid for recognition, from a speech signal detected through the endpoint detector; a noise removing filter configured to remove a factor degrading a recognition performance (breathing sound, lips sound, etc.) from an input speech signal; a vocabulary recognition device configured to check whether the input speech signal corresponds to a recognized vocabulary; and a post-processing device configured to determine whether to accept or reject a result of recognition by using confidence measures of similarity obtained by a regular model arranged by a recognition process and similarity obtained by an anti-model.

SUMMARY

In a robot according to the related art, a noise generated from the robot, for example, a noise of a motor or a noise of a speaker may be input to a microphone together with a voice of a user, and the accuracy of speech recognition may be lowered due to the noise generated by the robot.

Embodiments provide a robot in which an anti-noise speaker provides a highly reliable anti-noise that may cancel the noise which is input to the microphone after being generated from a noise source, so that it is possible to minimize the input of the noise, which is generated from the noise source, into the microphone, and accuracy and reliability of speech recognition or acoustic recognition can be increased.

In one embodiment, a robot includes: a noise source configured to generate a noise; a microphone assembly to which a voice is input; an accelerometer connected to the noise source; and a controller configured to control the microphone assembly.

The microphone assembly may include: a microphone housing formed in one surface thereof with an opening and formed therein with a space; a microphone accommodated in the space on one wall of the microphone housing; and an anti-noise speaker accommodated in the space on another wall of the microphone housing while being spaced apart from the microphone.

The controller may include an anti-noise generator configured to acquire the noise from the accelerometer and output a signal corresponding to an anti-noise against the acquired noise to the anti-noise speaker.

A gap may be formed between the microphone and the anti-noise speaker, and the opening may face the gap.

The anti-noise speaker may be disposed such that one surface of the anti-noise speaker faces the microphone. The opening may face a space between the one surface of the anti-noise speaker and an input portion of the microphone.

The accelerometer may be connected to the controller through a signal line.

The controller may include: a PCB; and a signal processer installed on the PCB and including the anti-noise generator.

The microphone assembly may be spaced apart from the PCB, and the anti-noise speaker may be connected to the controller through a speaker input line.

The microphone housing, the microphone, and the anti-noise speaker may be installed on the PCB.

The robot may further include an outer cover configured to cover one surface of the PCB and having a microphone hole. The microphone assembly is installed on a surface opposed to the one surface of the PCB. The PCB may have a PCB hole facing each of the opening and the microphone hole.

The microphone housing may cover the PCB hole on an opposite side of the outer cover.

In an embodiment, a robot may include: a speaker; an outer body constituting an exterior and having a microphone hole; and a driver configured to perform a motion of the outer body, wherein at least one of the speaker or the driver may be a noise source, and the accelerometer may be connected to at least one of the speaker or the driver.

The details of one or more implementations are set forth in the accompanying drawings and the description below. Other features will be apparent from the description and drawings, and from the claims.

DETAILED DESCRIPTION OF THE EMBODIMENTS

Figure 1:
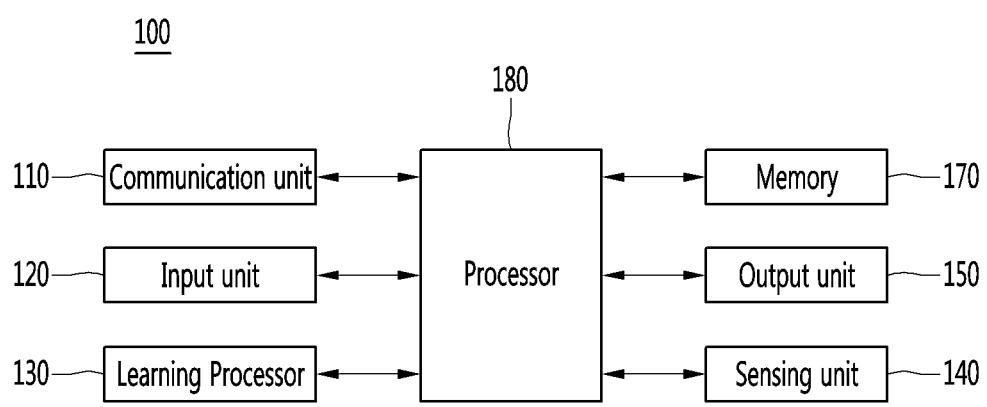
FIG. 1 is a view illustrating an AI device including a robot according to an embodiment.

Hereinafter, embodiments will be described in detail with reference to the accompanying drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driver may include an actuator or a motor and may perform various physical operations such as moving a robot joint. In addition, a movable robot may include a wheel, a brake, a propeller, and the like in a driver, and may travel on the ground through the driver or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100*a* to 100*e* and the AI server 500 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in the memory 170. Furthermore, the processor 180 may operate two or more of the components included in the AI device 100 in combination so as to drive the application program.

Figure 2:
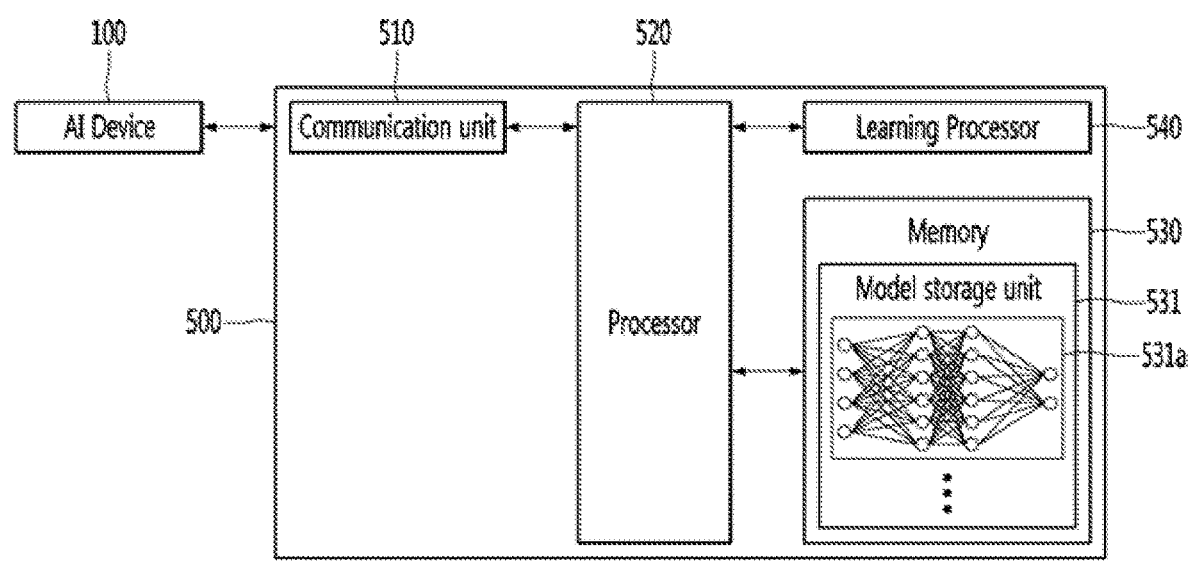
FIG. 2 is a view illustrating an AI server connected to the robot according to the embodiment.

FIG. 2 illustrates an AI server 500 connected to a robot according to an embodiment of the present invention.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communication unit 510, a memory 530, a learning processor 540, a processor 560, and the like.

The communication unit 510 can transmit and receive data to and from an external device such as the AI device 100.

The memory 530 may include a model storage unit 531. The model storage unit 531 may store a learning or learned model (or an artificial neural network 531a) through the learning processor 540.

The learning processor 540 may learn the artificial neural network 531a by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 530.

The processor 560 may infer the result value for new input data by using the learning model and may generate a response or a control command based on the inferred result value.

Figure 3:
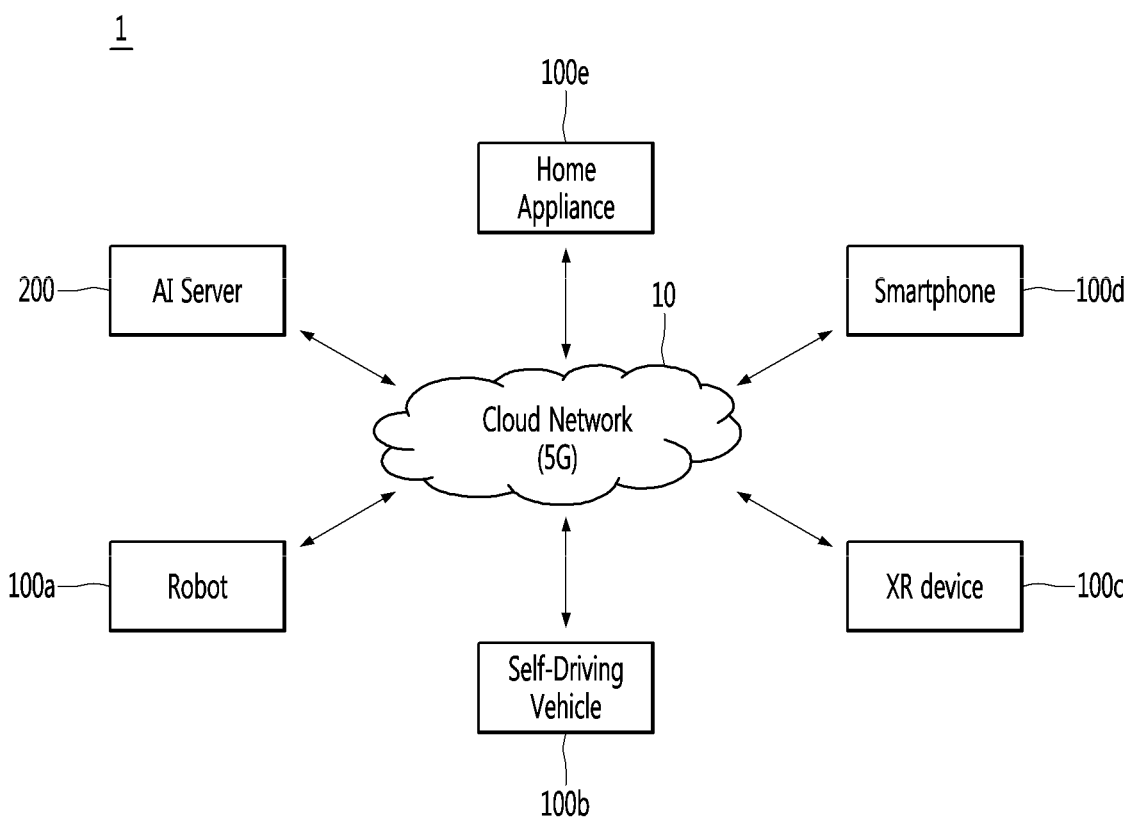
FIG. 3 is a view illustrating an AI system that employs the robot according to the embodiment.

FIG. 3 illustrates an AI system 1 according to an embodiment of the present invention.

Referring to FIG. 3, in the AI system 1, at least one of an AI server 500, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 500 configuring the AI system 1 may be connected to each other through the cloud network 10. In particular, each of the devices 100a to 100e and 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 500 may learn the artificial neural network according to the machine learning algorithm instead of the AI devices 100a to 100e, and may directly store the learning model or transmit the learning model to the AI devices 100a to 100e.

At this time, the AI server 500 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 500.

At this time, the robot 100a may perform the operation by generating the result by directly using the learning model, but the sensor information may be transmitted to the external device such as the AI server 500 and the generated result may be received to perform the operation.

The robot 100a may use at least one of the map data, the object information detected from the sensor information, or the object information acquired from the external apparatus to determine the travel route and the travel plan, and may control the driver such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driver based on the control/interaction of the user. At this time, the robot 100a may acquire the intention information of the interaction due to the user's operation or speech utterance, and may determine the response based on the acquired intention information, and may perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driver of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

Figure 4:
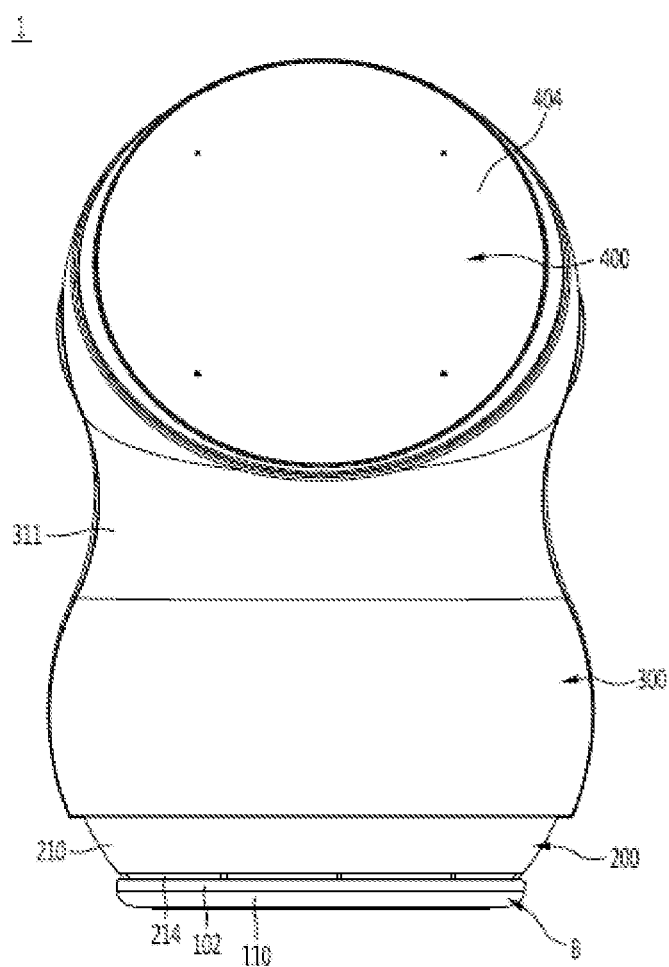
FIG. 4 is a front view illustrating the robot according to the embodiment.
Figure 5:
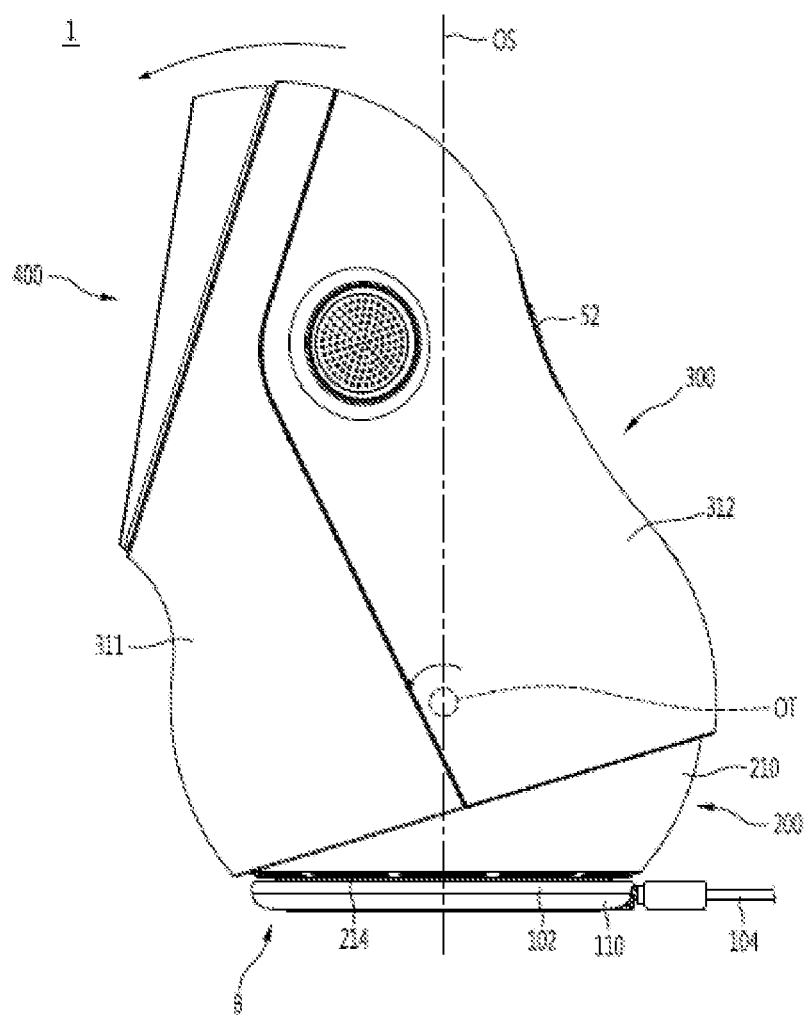
FIG. 5 is a side view illustrating a state in which an outer body is tilted forward according to the embodiment.
Figure 6:
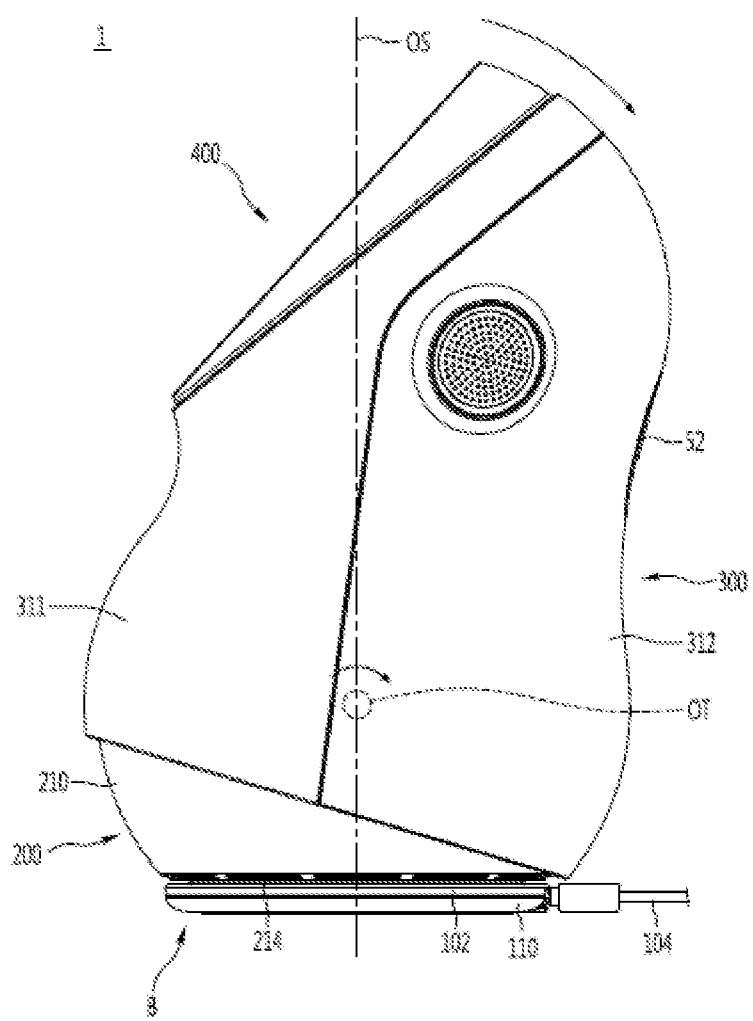
FIG. 6 is a side view illustrating a state in which the outer body is tilted rearward according to the embodiment.

FIG. 4 is a front view illustrating the robot according to the embodiment, FIG. 5 is a side view illustrating a state in which an outer body is tilted forward according to the embodiment, and FIG. 6 is a side view illustrating a state in which the outer body is tilted rearward according to the embodiment.

Figure 7:
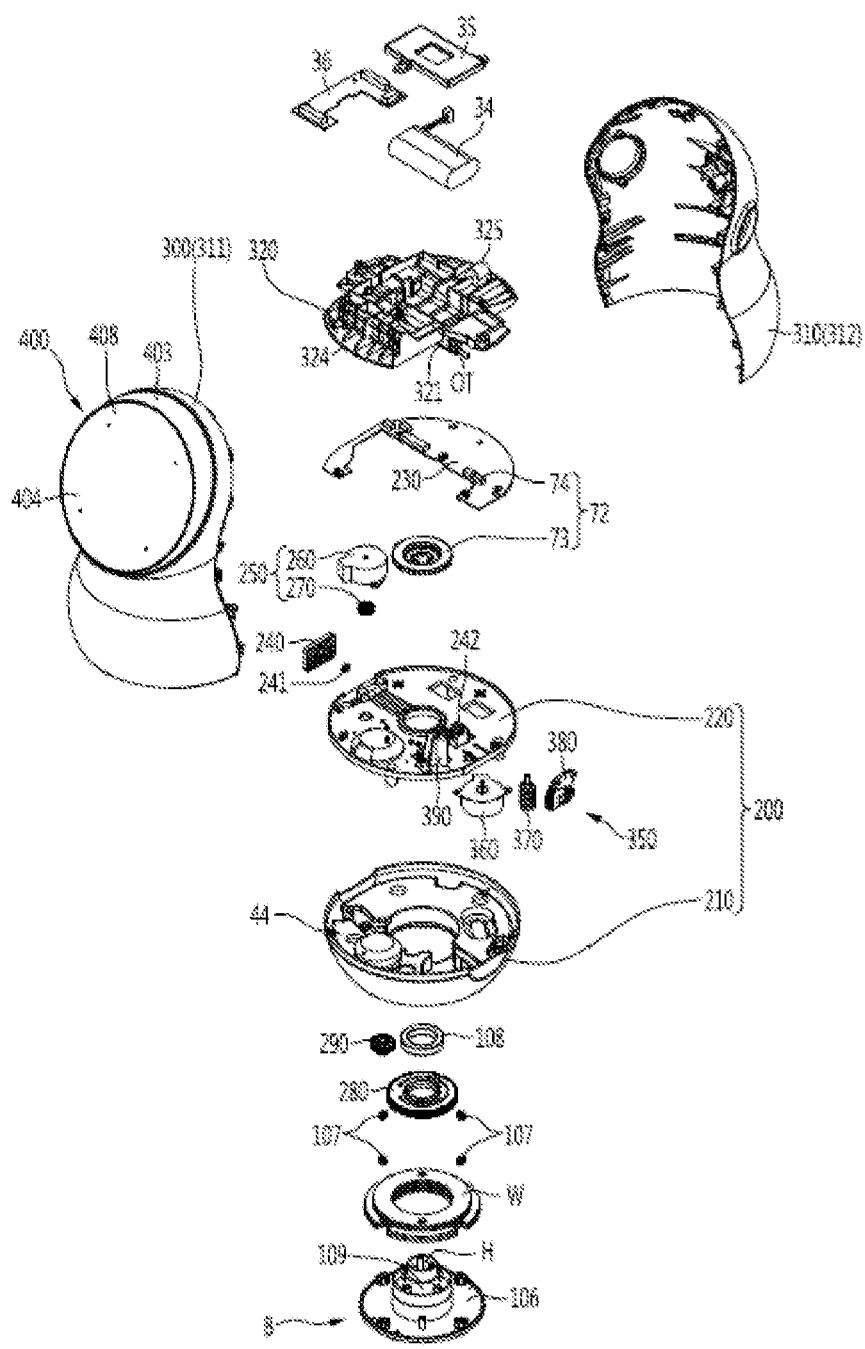
FIG. 7 is an exploded perspective view illustrating the robot according to the embodiment.
Figure 8:
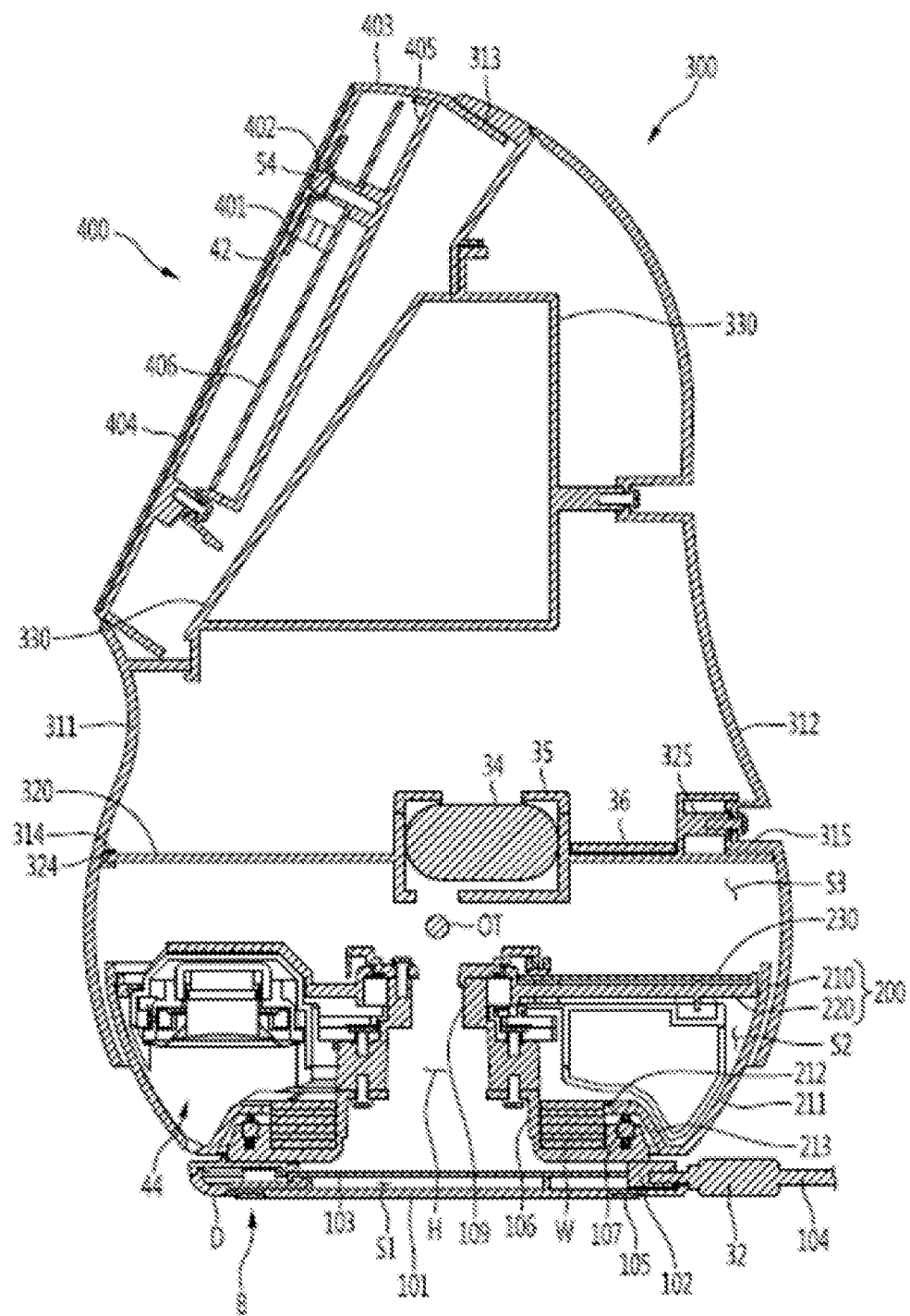
FIG. 8 is a sectional view illustrating the robot according to the embodiment.

FIG. 7 is an exploded perspective view illustrating the robot according to the embodiment, and FIG. 8 is a sectional view illustrating the robot according to the embodiment.

The robot may include a base B and an outer body 300. The robot may include a driver configured to perform a motion of the robot. The driver may be connected to the outer body 300 to perform a three-dimensional motion of the outer body 300.

The driver may be disposed on the base B and supported by the base B. The driver may rotate and tilt the outer body 300. The driver may rotate the outer body 300, may tilt the outer body 300, and may tilt the outer body 300 while rotating the outer body 300.

The driver may include: a spin body 200 rotatably disposed on the base B; a spin mechanism 250 configured to rotate the spin body 200; and a tilting mechanism 350 disposed on the spin body 200 and connected to the outer body 300 to tilt the outer body 300.

The spin mechanism 250 and the tilting mechanism 350 may be driven independently or simultaneously, and may allow the outer body 300 to perform a complex motion during the simultaneous driving.

The spin mechanism 250 may allow the spin body 200 to be rotated about the base B. The spin body 200 may rotate about a rotational axis OS extending in a vertical direction, and the spin mechanism 250 may rotate the spin body 200 about the rotational axis OS.

The tilting mechanism 350 may tilt the outer body 300 about a tilting shaft OT. The outer body 300 may be tilted about the tilting shaft OT extending in a horizontal direction, and the tilting mechanism 350 may tilt the outer body 300 such that the outer body 300 is inclined to one side with respect to the spin body 200.

The tilting mechanism 350 may be mounted on the spin body 200, and when the spin body 200 is rotated by the spin mechanism 250, the tilting mechanism 350 and the outer body 300 may be rotated together with the spin body 200.

The robot may include at least one interface installed on at least one of the spin body 200 or the outer body 300.

A robot 100a may include a controller configured to control the robot 100a. The controller may be a processor 180 installed in the robot. In the following description, the controller will be denoted with the same reference numeral as the processor.

The controller 180 may be provided in the server 500 or a terminal so as to control the robot 100a through a network.

The robot 100a may include a communication unit 110 configured to communicate with the network. The communication unit 110 may include a communication module such as a Wi-Fi module, a Bluetooth module, a Zigbee module, and a Z-wave module. The communication unit 110 may be changed according to a communication scheme of a device to be directly communicated.

Information acquired from the input unit 120 may be transmitted over the network through the communication unit 110. The information may be received by the robot 100a on the network through the communication unit 110, and the controller 180 may control the output unit 150 or the driver based on the received information.

The robot 100a may further include the memory 170 configured to store information acquired through a driving detection unit. The memory 170 may store the information received from the network through the communication unit 110. The memory 170 may store commands input to the input unit 120.

The robot 100a may include a power supply device configured to supply power to the respective components of the robot 100a. The power supply device may include a power connection unit 32 capable of connecting an external wired power cable. The power connection unit 32 may be implemented by a socket. The power supply device may include a battery 34. The battery 34 may be provided for charging. The power supply device may further include a charging module capable of charging the battery 34, for example, a wireless charging module.

The robot 100a may include the output unit 150. The output unit 150 may output the information visually or audibly to an outside.

The output unit 150 includes a display 42 configured to visually output information. The output unit 150 may include a speaker 44 configured to output information audibly.

The robot 100a may include the input unit 120. The input unit 120 may receive a command for controlling the robot 100a. The input unit 120 may be configured to allow a user to directly input a command or the like without passing through the communication unit 110.

The input unit 120 may include a switch 52. The switch 52 may include a power switch configured to turn on/off the power of the robot 100a. The switch 52 may include a function switch capable of setting a function of the robot 100a. It is possible to preset various commands to the robot 100a through a combination of a pressing time of the function switch and/or the number of times of continuously pressing the function switch. The switch 52 may include a reset switch capable of resetting a preset setting of the robot 100*a*. The switch 52 may include a sleep switch configured to switch the robot 100*a* to a power-saving state or a non-output state.

The input unit 120 may include a sensor configured to sense an external visual image, for example, a camera 54. The camera 54 may acquire an image for recognizing a user. The camera 54 may acquire an image for recognizing a direction of the user. Image information acquired by the camera 54 may be stored in the memory 170.

The input unit 120 may include a touch-type display.

Figure 9:
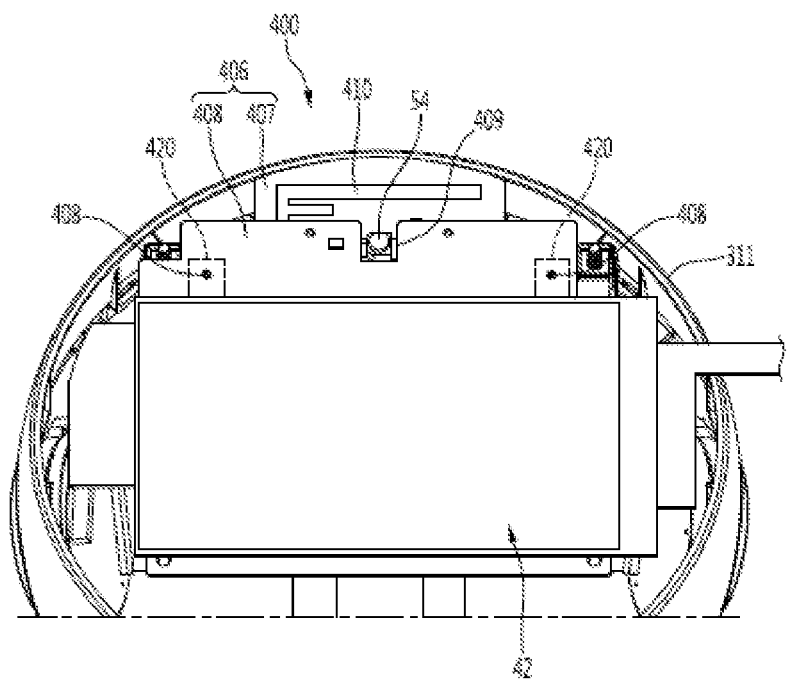
FIG. 9 is a front view illustrating an inside of an interface module according to the embodiment.
Figure 10:
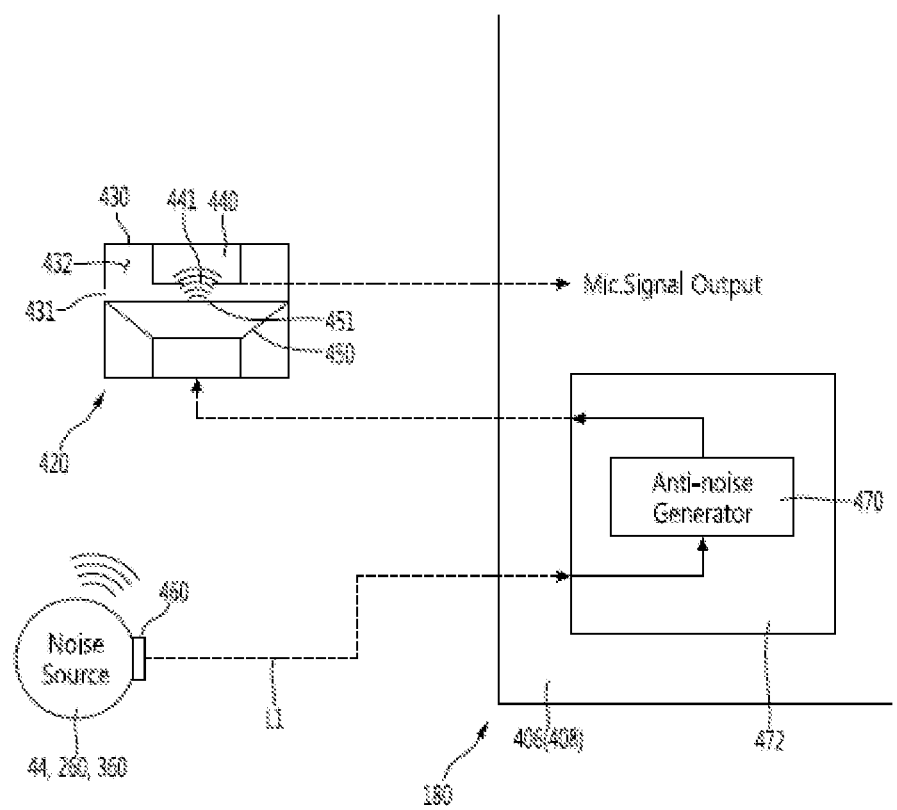
FIG. 10 is a view illustrating an accelerometer, a microphone assembly, and a controller according to the embodiment.
Figure 11:
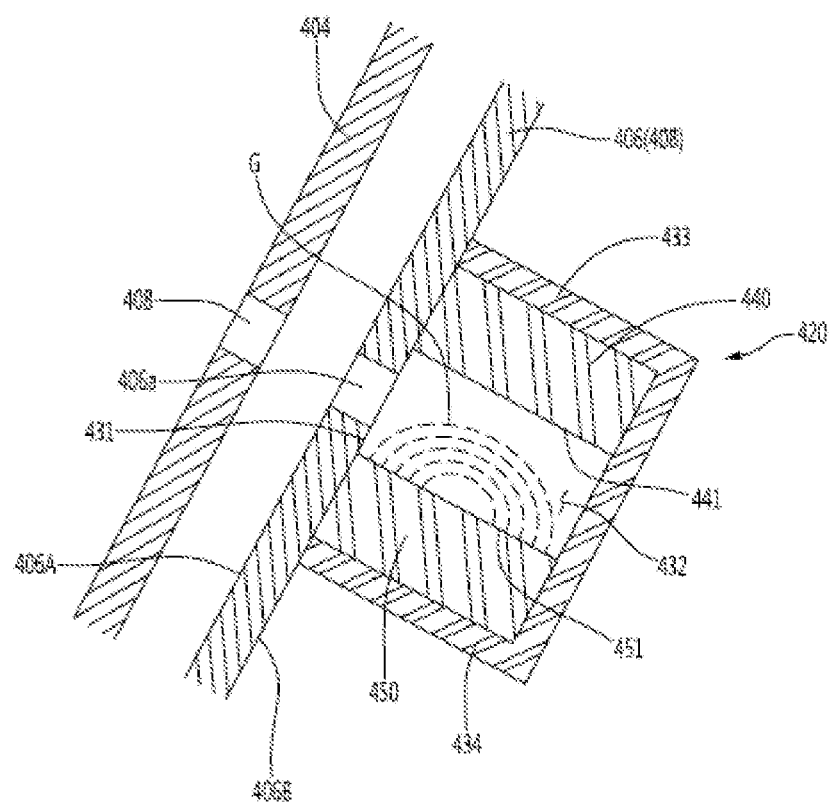
FIG. 11 is a sectional view illustrating the microphone assembly and the controller according to the embodiment.

The input unit 120 may include a microphone assembly 420 configured to sense an external sound (see FIGS. 9 to 11). When the robot 100*a* is provided with the microphone assembly 420, the controller 180 of the robot 100*a* may recognize a voice of the user input through the microphone assembly 420 to extract a command. In order to recognize a position of a sound source, the input unit 120 may include a plurality of microphone assemblys 420. Sound information or position information about the user acquired by the microphone assembly 420 may be stored in the memory 170.

The robot 100*a* may include a direction sensor configured to sense the direction of the user with respect to the robot 100*a*. The direction sensor may include the camera 54 and/or the microphone assemblys 420.

The robot 100*a* may give the same feeling as a living creature by performing the motion of the robot 100*a* together with output contents of the display 42 of the robot 100*a* or output contents of the speaker 44 of the robot 100*a*. Just as the gesture (motion) or eye contact play a big role in human-to-human communication, the motion of the robot 100*a* performed by the driver may function to efficiently recognize the output contents of the output unit 150 to the user. The motion of the robot 100*a* performed by the driver is for adding emotional elements in a communication process between the user and the robot 100*a*.

The robot 100*a* includes the driving detection unit capable of detecting a current motion state caused by the driver. The driving detection unit includes a spin angle detection unit configured to sense a rotating angle of the spin body 200 about the rotational axis OS. When the robot further includes the outer body 300 and the tilting mechanism 350, the driving detection unit may include a tilting angle detection unit configured to sense a rotating angle (inclined angle) of the outer body 300 about the tilting shaft OT with respect to the spin body 200.

The controller 180 may control the communication unit 110 based on control information received from the input unit 120. The controller 180 may control the communication unit 110 to store the information received from the network in the memory 170. The controller 180 may perform a control such that the information stored in the memory 170 is transmitted to the network via the communication unit 110.

The controller 180 may receive the control information from the input unit 120. The controller 180 may perform a control such that the output unit 150 outputs predetermined information. The controller 180 may perform a control such that the driver is driven together with the information output of the output unit 150.

For example, the controller 180 may recognize the user based on the image acquired by the camera 54, and may operate the output unit 150 and the driver based on a result of the recognition. When the recognized user matches a preset user, the controller 180 may display a smile image on the display 42 and operate the tilting mechanism 350 to tilt the outer body 300 in the vertical or horizontal direction.

As another example, the controller 180 may recognize a face position of the user based on the direction sensor, and may operate the output unit 150 and the driver based on a result of the recognition. The controller 180 may display predetermined information on the display 42 and operate the spin mechanism 250 to allow the display 42 to be directed toward a face of the user. In order to switch an image output direction of an interface module 400 to the direction of the user detected by the direction sensor, the controller 180 may control the spin body 200 to rotate.

The controller 180 may control whether to operate the driver based on the control information received from the network via the communication unit 110. The controller 180 may control the driver based on the control information received from the input unit 120. The controller 180 may control the driver based on the control information stored in the memory 170.

The display 42, the speaker 44, the camera 54, and the microphone assembly 420, which constitute the robot 100*a*, may be interfaces for assisting communication between a human and the robot 100*a*. These interfaces may be mounted on the spin body 200 so as to be rotated together with the spin body 200 when the spin body 200 rotates, and may be mounted on the outer body 300 so as to be tilted together with the outer body 300 when the outer body 300 is tilted.

In a communication robot 100*a*, the interfaces such as the display 42, the speaker 44, the camera 54, and the microphone assembly 420 may be distributed in the spin body 200 and the outer body 300.

The robot 100*a* may include an interface module 400 including at least one of the interfaces such as the display 42, the speaker 44, the camera 54, or the microphone assembly 420, and the interface module 400 may be mounted on the outer body 300 to spin together with the outer body 300 when the spin body 200 rotates and to tilt together with the outer body 300 when the outer body 300 is tilted.

Meanwhile, the battery 34, the display 42, the speaker 44, the camera 54, the microphone assembly 420, the spin mechanism 250, the tilting mechanism 350, and the like are preferably supported by the spinning body 200 or the outer body 300 in consideration of weights or sizes thereof, and are preferably arranged to lower the center of gravity of the robot 100*a* as much as possible.

The base B may rotatably support the spin body 200, and may support a load transmitted from the spin body 200. When the robot further includes the outer body 300 and the interfaces, loads of the outer body 300 and the interfaces may be transmitted to the base B through the spin body 200.

Hereinafter, the base B will be described in detail with reference to FIGS. 8 and 9.

The base B may include a combination of a plurality of members. The base B may include a lower base 101, and an upper base 102 disposed on the lower base 101.

The base B may be formed therein with a PCB accommodation space S1 for accommodating a base PCB 103. The PCB accommodation space S1 may be formed between the lower base 101 and the upper base 102 or may be formed inward of the upper base 102.

The base PCB 103 may be accommodated in the PCB accommodation space S1 formed in the base B, and may be protected by the base B.

The base PCB 103 may be directly connected to the power connection unit 32 to which a power cord 104 is connected, or may be connected to the power connection unit 32 through a separate wire.

A light source such as an LED may be disposed in the base PCB 103. In this case, the base B may function as a lighting device, and the base B may function as an interface for providing visual information to the outside.

The base B may further include a base decor member D through which light emitted from the light source such as the LED is transmitted.

The base B may further include a non-skid member 105 disposed on a bottom surface of the lower base 101. The non-skid member 105 may have a ring shape or a disc shape, and may be attached to the bottom surface of the lower base 101. The non-slip member 105 may be a non-slip mat having a large frictional force with the ground.

The robot may include at least one rolling bearing 107. The rolling bearing 107 may be installed on the base B to support the spin body 200.

The base B may include a bearing supporter 106 configured to support the rolling bearing 107.

The rolling bearing 107 may have an inner rim connected to the bearing supporter 106 through a support shaft, and an outer rim that rotates according to the inner rim.

A plurality of rolling bearings 107 may be provided on the base B. The rolling bearings 107 may support the spin body 200, particularly, a spin housing 210 while being spaced apart from the base B.

The rolling bearings 107 may be disposed along a virtual circle, and the rolling bearings 107 may transmit the load acting on the spin body 200 to the base B, particularly, the bearing supporter 106 in a distributed manner.

The base B may be provided with a weight body W capable of increasing the weight of the base B. The weight body W is an object having a larger weight than a volume. The weight body W may lower the center of gravity of the robot 100a as much as possible, and may assist the robot 100a so that the robot 100a is prevented from overturning. The weight body W may be disposed in the bearing supporter 106. A plurality of weight bodies W may be stacked in the vertical direction.

The base B may be provided with an upper bearing 108 configured to rotatably support the spin body 200. In addition, the base B may further include a fixed shaft 109 on which the upper bearing 108 is mounted. The fixed shaft 109 may be a rotation center axis of the spin body 200, and a central axis of the fixed shaft 109 may be the rotational axis OS. The fixed shaft 109 may be disposed above the bearing supporter 106. The fixed shaft 109 may be coupled to the bearing supporter 106 by a fastening member such as a screw.

The upper bearing 108 may be mounted on the fixed shaft 109 so as to be disposed above a spin driven gear 280 that will be described below. The upper bearing 108 may surround an outer circumference of an upper portion of the fixed shaft 109.

The upper bearing 108 may be an upper rolling bearing disposed between the fixed shaft 109 and a spin cover 220 that will be described below.

The upper bearing 108 may include an inner rim fixed to the outer circumference of the fixed shaft 109, an outer rim fixed to an upper bearing housing 221 formed in the spin cover 220, and a rolling member such as a ball or a roller disposed between the inner rim and the outer rim.

The upper bearing 108 may be disposed above the spin driven gear 280 while being spaced apart from the spin driven gear 280, and may rotatably support the spin cover 220. An axial center of the upper bearing 108 may be a vertical axis, and an axial center of the upper bearing 108 may coincide with the rotational axis OS.

The spin driven gear 280 may be mounted on the fixed shaft 109, and the spin driven gear 280 may be mounted on the fixed shaft 109 by the fastening member such as a screw. The spin driven gear 280 may have a double structure of an upper gear and a lower gear, and the upper gear and the lower gear may be fixed to each other. The spin driven gear 280 may guide the spin body 200 to allow the spin body 200 to rotate while being fixedly mounted on the fixed shaft 109. The spin body 200 may be rotated along a locus of the spin driven gear 280.

The fixed shaft 109 may be formed therein with a through-hole H through which a wire and the like may pass. The through-hole H may be formed to pass through the fixed shaft 109 in the vertical direction.

The wire or the like passing through the through-hole H of the fixed shaft 109 may connect the base PCB 103 to at least one of a PCB 230 mounted on the spin body 200, a PCB 340 mounted on the outer body 300, or an interface PCB 406 of the interface module 400.

Hereinafter, the spin body 200 will be described.

The spin body 200 may be rotatably supported on the base B. The spin body 200 may be placed on the rolling bearing 107, and may spin about the fixed shaft 109 while being placed on the rolling bearing 107.

The spin body 200 may include a combination of a plurality of members, and may include the spin housing 210 formed therein with a space S2, and the spin cover 220 configured to cover the space S2.

At least one interface may be accommodated in the space S2 of the spin body 200. The interface may be the speaker accommodated in the spin body 200. The speaker 44 may be disposed under the spin cover 220 and protected by the spin cover 220, and the spin housing 210 and the spin cover 220 may function as a protective cover that protects the speaker 44. The spin body 200 may be an interface housing that protects the interface accommodated in the space S2.

A part of the spin housing 210 may be exposed to the outside. A part of the spin housing 210 may be seen through a lower side of a lower end of the outer body 300, and the spin housing 210 may constitute a part of an exterior of the robot.

The spin housing 210 may have a shape in which a top surface thereof is opened and a size thereof is gradually reduced downward. An outer surface of the spin housing 210 may be convex toward the outside.

The spin housing 210 may include an outer hollow body 211 and an inner hollow body 213.

The outer hollow body 211 may have the space S2 in which the speaker 44 may be accommodated, and a size of the outer hollow body 211 may be gradually reduced downward.

The inner hollow body 213 may extend from a lower end of the outer hollow body 211 toward the space S2 formed inside the outer hollow body 211.

The inner hollow body 213 may be formed at a center thereof with a base through-hole 212 through which a part of the base B passes.

The spin cover 220 may have a plate shape as a whole, and may be placed on an upper end of the spin housing 210. The spin cover 220 may be inserted into the spin housing 210 and coupled with the spin housing 210 inside the spin housing 210.

Tilting shaft supporters 240 and 242 (see FIG. 7) configured to rotatably support the tilting shaft OT may be disposed on the spin cover 220. The tilting shaft supporters 240 and 242 may be disposed on a top surface of the spin cover 220. A pair of tilting shaft supporters 240 and 242 may be spaced apart from each other in the horizontal direction, and the tilting shaft OT may be rotatably supported by the tilting shaft supporters 240 and 242 through a bearing 241.

The robot may further include the PCB 230 (see FIGS. 7 and 8) disposed on the top surface of the spin cover 220. The PCB 230 may be smaller than the spin cover 220, and may cover a part of the top surface of the spin cover 220. The PCB 230 may be horizontally disposed on the top surface of the spin cover 220. The PCB 230 may be a rotation PCB mounted on the spin cover 220 to rotate together with the spin cover 220.

The PCB 230 may control at least one electrical component mounted on the spin cover 220. For example, the PCB 230 may be a motor control PCB configured to control a spin motor 260 and a tilting motor 360.

Hereinafter, the spin mechanism 250 will be described.

The spin mechanism 250 may be connected to the spin body 200 to rotate the spin body 200.

The spin mechanism 250 may include the spin motor 260, a spin driving gear 270, and the spin driven gear 280.

The spin motor 260 may be disposed on the spin cover 220, and a driving shaft may protrude from a lower portion of the spin motor 220.

The spin motor 260 may be disposed on the top surface of the spin cover 220. The spin motor 260 may be fastened to the spin cover 220 by the fastening member such as a screw. The driving shaft of the spin motor 260 may be vertically disposed on the lower portion of the spin motor 260. The driving shaft of the spin motor 260 may protrude toward the space S2.

A through-hole through which at least one of the driving shaft of the spin motor 260 or the spin driving gear 270 passes may be formed vertically through the spin cover 220. At least one of the driving shaft of the spin motor 260 or a rotational shaft of the spin driving gear 270 may be disposed in the through-hole of the spin cover 220.

The spin driving gear 270 may be engaged with the driving shaft of the spin motor 260 in the space S2. The spin driving gear 270 may rotate inside the spin body 200, and may be protected by the spin body 200. The spin driving gear 270 may be suspended from the driving shaft of the spin motor 260. The spin driving gear 270 may be rotated by the spin motor 260 under a bottom surface of the spin cover 220.

The spin driven gear 280 may be fixed to the base B. The spin driven gear 280 may be a fixed gear that is fixedly mounted on the fixed shaft 109 of the base B.

In the spin mechanism 250, the spin driving gear 270 may be engaged with the spin driven gear 280. In this case, the spin driving gear 270 may rotate while revolving along an outer circumference of the spin driven gear 280.

In the spin mechanism 250, the spin driving gear 270 is not directly engaged with the spin driven gear 280, and the spin driving gear 270 and the spin driven gear 280 may be connected to each other via a spin intermediate gear 290 (see FIG. 7).

The spin intermediate gear 290 may be rotatably connected to the spin cover 220. The spin cover 200 may be provided with an intermediate gear support shaft configured to rotatably support the spin intermediate gear 290. The intermediate gear support shaft may protrude downward from the bottom surface of the spin cover 220. Similar to the spin driving gear 270, the spin intermediate gear 290 may be accommodated in the space S2 of the spin body 200.

The spin intermediate gear 290 may transmit power between the spin driving gear 270 and the spin driven gear 280. The spin intermediate gear 290 may revolve along the outer circumference of the spin driven gear 280.

Hereinafter, the outer body 300 will be described.

The outer body 300 may be larger than the spin housing 210. A bottom surface of the outer body 300 may be opened. The outer body 300 may be formed therein with an upper space S3. The upper space S3 may be a space in which a tilting base 320 is accommodated.

The outer body 300 may include a combination of a plurality of members, and a plurality of bodies that are disposed in a longitudinal or vertical direction may be coupled to each other to constitute the outer body.

The outer body 300 may include a first outer body 311 on which the interface module 400 is mounted and a second outer body 312 coupled to the first outer body 311, and the upper space S3 may be formed between the first outer body 311 and the second outer body 312.

When the first outer body 311 is a front outer body, the second outer body 312 may be a rear outer body coupled to a rear end of the first outer body 311. When the first outer body 311 is a left outer body, the second outer body 312 may be a right outer body coupled to a right end of the first outer body 311.

The outer body 300 may have an opening 313 (see FIG. 8) in which the interface module 400 is disposed. The interface module 400 may be inserted into the opening 313 so as to be disposed in the opening 313.

The opening 313 of the outer body 300 may be formed in the first outer body 311. In this case, the first outer body 311 may be a front housing that faces the human so as to communicate with the human.

Hereinafter, the tilting mechanism 350 will be described.

The tilting mechanism 350 may include the tilting base 320.

The tilting base 320 may be protected by the outer body 300 while being accommodated in the upper space S3 of the outer body 300. The tilting base 320 may be connected to the tilting shaft OT to rotate together with the tilting shaft OT. The tilting base 320 may be provided with a tilting shaft connecting portion 321 (see FIG. 7) to which the tilting shaft OT is connected. The tilting shaft connecting portion 321 may extend in the horizontal direction at a lower portion of the tilting base 320.

The tilting shaft OT may extend from the tilting base 320 in the horizontal direction.

The tilting shaft OT may be connected to the tilting base 320, and the tilting base 320 may be coupled to the outer body 300. During the rotation of the tilting shaft OT, the tilting base 320 and the outer body 300 may be tilted about the tilting shaft OT while rotating together. The tilting base 320 and the outer body 300 may constitute a tilting body capable of tilting the interface module 400.

The outer body 300 may be provided at an inner surface thereof with a tilting base coupling portion 314 (see FIG. 8) to which the tilting base 320 is coupled. In addition, the tilting base 320 may be provided with a coupling portion 324 (see FIG. 8) into which the tilting base coupling portion 314 is inserted and fitted.

The tilting base coupling portion 314 may include a pair of ribs spaced apart from each other by an interval corresponding to a thickness of the coupling portion 324 so that the coupling portion 324 may be inserted and fitted into the pair of ribs.

The coupling portion 324 may be formed at a part of an outer circumference of the tilting base 320 so as to be inserted between the pair of ribs.

The outer body 300 may be provided with a tilting base mounter 315 (see FIG. 8) fastened to the tilting base 320 by the fastening member such as a screw. In addition, the tilting base 320 may be provided with a fastening portion 325 (see FIG. 8) fastened to the tilting base mounter 315 by the fastening member such as a screw.

The tilting base mounter 315 may protrude from the outer body 300 toward the upper space S3.

The fastening portion 325 may include a fastening boss to which the fastening member such as the screw is fastened. The fastening portion 325 may be formed on an opposite side of the coupling portion 324 in the tilting base 320.

The tilting base 320 may be disposed across the upper space S3 formed in the outer body 300.

The tilting base coupling portion 314 and the tilting base mounter 315 may be provided on an inner lower portion of the outer body 300. In this case, the tilting base 320 may be disposed across the inner lower portion of the outer body 300 so as to reinforce the strength of a lower portion of the outer body 300.

In the robot, the battery 34 may be mounted on at least one of the base B, the spin body 200, the outer body 300, or the interface module 400.

The battery 34 is preferably mounted in a component that has a height relatively lower than heights of other components of the robot and is located at the rotational axis OS. To this end, the battery 34 may be disposed on the tilting base 320. The tilting base 320 may be provided with a pocket into which the battery 34 is inserted and accommodated. The tilting base 320 may be coupled with a battery cover 35 (see FIG. 8) to prevent the battery 34 accommodated in the pocket from being separated.

The tilting base 320 may be provided with a connecting PCB 36. The connecting PCB 36 may be connected to at least one of the PCB 230 mounted on the spin cover 230 or the base PCB 103 by a wire, and may be connected to at least one of the PCB 340 mounted on the outer body 300 or the interface PCB 406 of the interface module 400 by a wire.

The tilting mechanism 350 may include: the tilting motor 360; the tilting driving gear 370 connected to the tilting motor 360; the tilting driven gear 380 connected to the tilting shaft OT or the tilting base 320 and engaged with the tilting driving gear 370.

The tilting motor 360 may be disposed under the spin cover 220, and may be accommodated in the space S2.

The tilting driving gear 370 may extend in a direction crossing the tilting shaft OT.

The tilting driven gear 380 may be disposed above the spin cover 220, and the tilting motor 360 and the tilting driven gear 380 may be connected to each other through the tilting driving gear 370 with the spin cover 220 interposed therebetween.

A through-hole through which at least one of a driving shaft of the tilting motor 360 or the tilting driving gear 370 passes may be formed vertically through the spin cover 220. At least one of the driving shaft of the tilting motor 360 or a rotational shaft of the tilting driving gear 370 may be disposed in the through-hole of the spin cover 220.

The spin cover 220 may be provided with a spin motor fastening portion to which the tilting motor 360 is fastened. The tilting motor 360 may be fastened to the spin motor fastening portion under the spin cover 220. The tilting motor 360 may be fastened to the spin cover by the fastening member such as a screw. The spin motor fastening portion may be a fastening boss or a fastening hole formed in the spin cover 220.

The driving shaft of the tilting motor 360 may be disposed in the direction crossing the tilting shaft OT. The tilting shaft OT may extend in the horizontal direction, and the driving shaft of the tilting motor 360 may extend in the vertical direction so as to be mounted on the spin cover 220.

The tilting driving gear 370 may be rotated by the tilting motor 360. The tilting driving gear 370 may be a worm gear disposed vertically. The worm gear that is the tilting driving gear 370 may be vertically disposed above the tilting cover 220 while being connected to the tilting motor 360.

The tilting driven gear 380 may be a spur gear that rotates about the tilting shaft OT. The tilting driven gear 380 may be connected to at least one of the tilting shaft OT or the tilting base 320 so as to rotate the outer body 300.

The tilting driven gear 380 may be connected to the tilting base 320 so as to rotate the tilting base 320 about the tilting shaft OT.

The tilting driven gear 380 may include a tilting base fastening portion that may be fastened to the tilting base 320 by the fastening member such as a screw.

The robot may further include a gear supporter 390 mounted on the spin cover 220 to support the tilting driving gear 360.

The spin cover 220 may be provided with a gear supporter fastening portion to which the gear supporter 390 is fastened. The gear supporter 390 may be fastened to the spin cover 220 by the fastening member such as a screw, and the gear supporter fastening portion may be a fastening boss or a fastening hole formed in the spin cover 220.

Meanwhile, the display 42, the camera 54, and the microphone assembly 420 may be mounted on the outer body 300 or the interface module 400 to rotate together with the outer body 300 when the spin body 200 rotates, and may be tilted together with the outer body 300 when the outer body 300 is tilted.

The interface module 400 may include interfaces other than the interfaces accommodated in the space S2, and may include the display 42, the camera 54, the microphone assembly 420, and the like.

Referring to FIG. 8, the interface module 400 may include: an interface case 403 mounted on the outer body 300 and having an opening 401 and a camera accommodation portion 402; an outer cover 404 disposed on a front surface of the interface case 403 to cover the opening 401 and the camera accommodation portion 402; and a back cover 405 coupled to the interface case 403.

A rear surface of the interface case 403 may be opened, and the opening 401 and the camera accommodation portion 402 may be formed in the front surface of the interface case 403.

The outer cover 404 may cover the front surface of the interface case 404.

The outer cover 404 may constitute the outer body 300, which constitutes the exterior of the robot, together with the first outer body 311 and the second outer body 312. The outer cover 300 may have at least one microphone hole 408 to allow a voice to be input to the microphone assembly 420 that will be described below.

The back cover 405 may be disposed inside the interface case 403, and may be fastened to the interface case 403 by the fastening member such as a screw. The back cover 405 may cover a rear surface of the interface PCB 406, particularly, a rear surface of a main PCB 407 (see FIG. 9) which will be described below.

The interface module 400 may further include the interface PCB 406 disposed in the back cover 405.

The display 42 constituting the interface of the embodiment may be disposed between the interface PCB 406 and the outer cover 404 to constitute the interface module 400. All or a part of the display 42 may be accommodated in the opening 401, and may output an image through the outer cover 404.

Meanwhile, the camera 54 constituting the interface of the embodiment may be disposed between the back cover 406 and the outer cover 404. All or a part of the camera 54 may be accommodated in the camera accommodation portion 402, and may capture an image through the outer cover 404.

Meanwhile, the robot may further include an inner frame 330 configured to support the outer body 300. The inner frame 330 reinforces the strength of the outer body 300, and the inner frame 330 may reinforce the strength of the outer body 300 by connecting weak portions of the outer body 300 to each other.

The strength of the outer body 300 around the opening 313 may be relatively weak, and the inner frame 330 may connect peripheries of the opening 313.

When the opening 313 is formed in the first outer body 311, the inner frame 330 preferably connects an upper periphery of the opening 313 to a lower periphery of the opening 313 in the first outer body 311. In addition, the inner frame 330 is preferably connected to an upper portion of the second outer body 312.

The inner frame 330 may have a polygonal shape, and may be disposed in the upper space S3 of the outer body 300 to function as a frame that supports the outer body 300.

The inner frame 330 may be disposed on the tilting base 310. In this case, the tilting base 310 may be a lower reinforcing member for reinforcing the strength of the lower portion of the outer body 300, and the inner frame 330 may be an upper reinforcing member for reinforcing the strength of an upper portion of the outer body 300.

FIG. 9 is a front view illustrating an inside of an interface module according to the embodiment, FIG. 10 is a view illustrating an accelerometer, a microphone assembly, and a controller according to the embodiment, and FIG. 11 is a sectional view illustrating the microphone assembly and the controller according to the embodiment.

The interface module 400 may include a plurality of PCBs 407 and 408, and the PCBs 407 and 408 may constitute the interface PCB 406.

The interface module 400 may include a pair of PCBs 407 and 408, and the pair of PCBs 407 and 408 may include a main PCB 407 and a sub-PCB 408.

The main PCB 407 and the sub-PCB 408 may be connected to each other by a flexible circuit board such as FPCB or a wire.

The interface module 400 may further include an antenna 410 configured to receive an external signal, and the antenna 410 may be installed on a front upper surface of the interface PCB 406, particularly, a front upper surface of the main PCB 407.

The main PCB 407 and the sub-PCB 408 may be spaced apart from each other.

The main PCB 407 may be inclined so that a front surface of the main PCB 407 faces a front upper side. The sub-PCB 408 may be arranged in parallel with the main PCB 407. The main PCB 407 and the sub-PCB 408 may be inclined so that front surfaces of the main PCB 407 and the sub-PCB 408 face the front upper side.

The interface module 400 may further include a circuit component such as a semiconductor chip or a diode disposed on the main PCB 407.

The front surface of the main PCB 407 may be a surface of the main PCB 407 that faces the sub-PCB 408 in the horizontal direction.

Preferably, the display 42 is disposed so as not to face the antenna 410.

The camera 54 is preferably disposed at a position that may minimize the possibility of signal interference of the antenna 410. It is preferable that the camera 54 is not installed on the main PCB 407. The camera 54 may be disposed in front of the main PCB 407 while being spaced apart from the main PCB 407.

The camera 54 may be disposed in the camera accommodation portion 402 (see FIG. 8) formed in the interface case 403.

The sub-PCB 408 may be provided at an upper portion thereof with an avoiding portion 409 to avoid the camera accommodation portion 402.

The outer cover 404 may be disposed on the front surface of the interface case 403. Similar to the main PCB 407 and the sub-PCB 408, a front surface of the outer cover 404 may face the front upper side.

The robot may include the microphone assembly 420 to which a voice transmitted from the outside is input. The microphone assembly 420 may include a microphone 440 having an input portion 441 to which a sound is input.

It is preferable that the robot removes a noise generated by the robot to recognize the sound transmitted from the outside of the robot with high reliability.

The robot may acquire a noise of a noise source of the robot from which the noise is generated and generate an anti-noise that may cancel the acquired noise to the input portion 441 of the microphone 440, so that it is possible to minimize the input of the noise, which is generated from the noise source, into the input portion 441 of the microphone 440.

The noise generated from the noise source of the robot is a noise that may interfere in recognition of a user speech. In the robot, it is preferable that the noise generated from the noise source is not input to the microphone.

One example of the noise source of the robot may be the speaker 44.

Another example of the noise source of the robot may be the driver configured to perform the motion of the outer body 300, particularly, a component that particularly generates a great noise among a plurality of components constituting the driver. A component that generates a relatively higher noise than other components among the components constituting the driver of the robot may be the spin motor 260 or the tilting motor 360, and the spin motor 260 or the tilting motor 360 may be the noise source.

The noise source is not limited to the speaker 44 or the driver, and components that generate a relatively higher noise among the components constituting the driver may be the noise source regardless of the type of the components.

Hereinafter, an example in which the speaker 44, the spin motor 260, and the tilting motor 360 are noise sources will be described, and the driver among the noise sources will be denoted with reference numerals 260 and 360.

The robot may include an accelerometer 460 connected to the noise generator 44, 260, and 360, and a controller 180 configured to control the microphone assembly 420.

The accelerometer 460 may be connected to at least one of the speaker 44 or the drivers 260 and 360.

The accelerometer 460 may be connected to each of the speaker 44, the spin motor 260, and the tilting motor 360. In other words, the robot may include a first accelerometer connected to the speaker 44, a second accelerometer connected to the spin motor 260, and a third accelerometer connected to the tilting motor 360.

In this case, the accelerometer 460 is an acceleration sensor, and the acceleration sensor includes a moving coil-type acceleration sensor, a piezoelectric acceleration sensor, a capacitive acceleration sensor, a strain gauge-type acceleration sensor, a servo acceleration sensor, a differential transformer-type acceleration sensor, and the like.

The accelerometer 460 may be connected to the controller 180 through a signal line L1, and a measurement value measured by the accelerometer 460 may be transmitted to the controller 180, particularly, a signal processor 472 that will be described below through the signal line L1.

The microphone assembly 420 may include a microphone housing 430, the microphone 440, and an anti-noise speaker 450, and may be configured such that the noise is canceled with high reliability around the input portion 441 of the microphone 440.

The microphone housing 430 may be formed on one surface thereof with an opening 431 and formed therein with a space 432.

The space 432 of the microphone housing 430 preferably has a size that may allow the noise, which is introduced into the input portion 441 of the microphone 440 after being generated from the noise source, to be effectively canceled.

The microphone 440 may be accommodated in the space 432 on one wall 433 of the microphone housing 430.

The anti-noise speaker 450 may be accommodated in the space 432 on another wall 434 of the microphone housing 430.

The anti-noise speaker 450 may be spaced apart from the microphone 440. A gap G may be formed between the anti-noise speaker 450 and the microphone 440.

The anti-noise speaker 450 and the microphone 440 may be disposed such that the opening 431 faces the gap G.

The anti-noise speaker 450 may be disposed such that one surface 451 of the anti-noise speaker 450 faces the microphone 440. The one surface 451 of the anti-noise speaker 450 may face the input portion 441 of the microphone 440.

The anti-noise speaker 450 and the microphone 440 may be disposed such that the opening 431 faces a space between the one surface 451 of the anti-noise speaker 450 and the input portion 441 of the microphone 440. In this case, the one surface 451 of the anti-noise speaker 450 may be an output surface from which a sound, particularly, an anti-noise is output from the anti-noise speaker 450.

The controller may include an anti-noise generator 470 (see FIG. 10). The anti-noise generator 470 may acquire the noise from the accelerometer 460 and output a signal corresponding to the anti-noise against the acquired noise to the anti-noise speaker 450.

The signal corresponding to the anti-noise may have a reverse-phase against the noise acquired by the accelerometer 460, and the controller may control the anti-noise speaker 450 such that the reverse-phase signal against the acquired noise may be extracted by the anti-noise speaker 450.

The controller may generate the reverse-phase signal against a signal of the noise, which is introduced into the microphone 440 after being generated from the noise source, to transmit the reverse-phase signal to the anti-noise speaker 450, and the anti-noise speaker 450 may generate the anti-noise, which may cancel the noise propagated toward the input unit 41 after being generated from the noise source, toward the input unit 41 of the microphone 440.

The microphone housing 430, the anti-noise speaker 450, and the anti-noise generator 470 may perform active noise cancellation to generate the anti-noise which may cancel the noise input to the input unit 41 of the microphone 440 after being generated from the noise source installed in the robot.

The active noise cancellation exhibits a low noise reduction performance when the opening 431 and the space 432 are large, while exhibiting a high noise reduction performance when the opening 431 and the space 432 are small.

For example, the robot may generate sounds that may be generated from the motor for each motor speed by the accelerometer 460 connected to the spin motor 260 or the tilting motor 360, the controller 180 may acquire the noise input to the microphone 440, and the controller 180 may control the anti-noise speaker 450 to generate the anti-noise having the reverse-phase against the acquired noise.

The anti-noise speaker 450 may generate the anti-noise having the reverse-phase against the acquired noise to transmit the generated anti-noise to the input portion 441 of the microphone 440, and the noise transmitted to the periphery of the input portion 441 of the microphone 440 after being generated from the noise source may be canceled by the anti-noise at the periphery of the input portion 441 of the microphone 440.

The controller may include: a PCB; and the signal processor 472 installed on the PCB and including the anti-noise generator 470. The anti-noise generator 470 may constitute a part of the signal processor 472.

One example of the PCB provided with the signal processor 472 may be the interface PCB 406. The microphone assembly 420 may be disposed in the sub-PCB 408. The microphone assembly 420 may be attached to the rear surface of the sub-PCB 408. The microphone assembly 420 may be attached to the sub-PCB 408 by a double-sided adhesive member such as a double-sided tape. The sub-PCB 408 may be a microphone PCB on which the microphone assembly 420 is mounted.

Hereinafter, the PCB provided with the signal processor 472 will be denoted with the same reference numeral as the interface PCB 406.

The microphone assembly 420 may be installed on the PCB 406. The microphone housing 430, the microphone 440, and the anti-noise speaker 450 may be installed on the PCB 406.

The outer cover 404 may cover one surface 406A of the PCB 406. The outer cover 404 may have a microphone hole 408 so that a voice may be input to the microphone assembly 420.

The microphone assembly 420 may be installed on a surface 406B opposed to the one surface 406A of the PCB 406.

The PCB 406 may have a PCB hole 406a facing each of the opening 431 and the microphone hole 408.

The microphone housing 430 may cover the PCB hole 406a on an opposite side of the outer cover 404.

Figure 12:
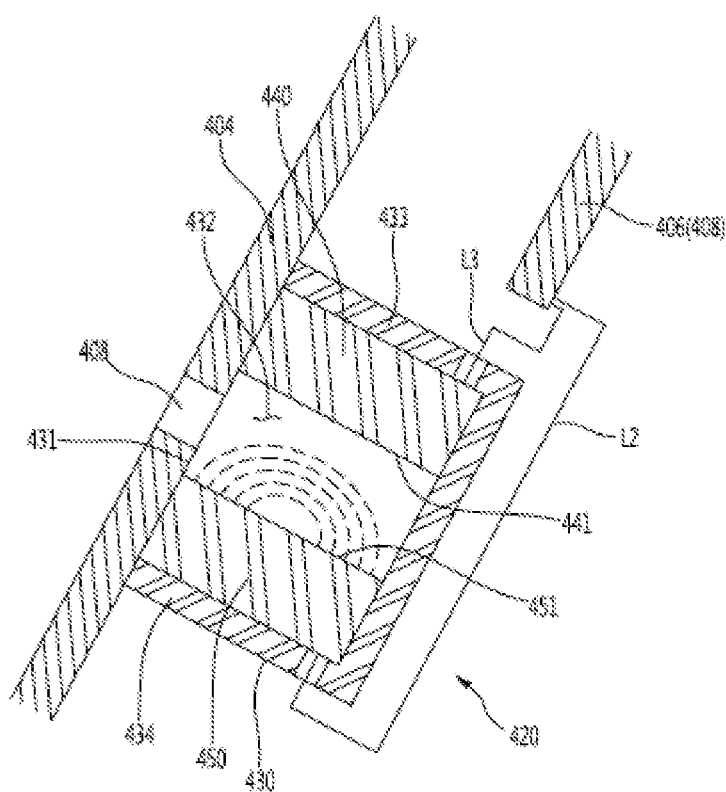
FIG. 12 is a sectional view illustrating another example of the microphone assembly according to the embodiment.

FIG. 12 is a sectional view illustrating another example of the microphone assembly according to the embodiment.

The microphone assembly 420 may be spaced apart from the PCB 406 provided with the signal processor 472.

The microphone housing 430 may be fixed to at least one of the interface case 403, the outer cover 404, or the back cover 405. For example, the microphone housing 430 may be fixedly attached by the adhesive member such as a double-sided tape.

The anti-noise speaker 450 may be connected to the controller 180, particularly, the PCB 406 provided with the signal processor 472 through a speaker input line L2.

The microphone 440 may be connected to the controller 180, particularly, the PCB 406 provided with the signal processer 472 through a microphone output line L3.

The microphone housing 430 may have a through-hole through which the speaker input line L2 or the microphone output line L3 may pass.

The configuration and operation of the modified example of the microphone assembly 420 shown in FIG. 12 are the same or similar to the configuration and operation of the microphone assembly 420 shown in FIG. 11 except for the configuration spaced apart from the PCB 406, so the detailed descriptions thereof will be omitted.

Figure 13:
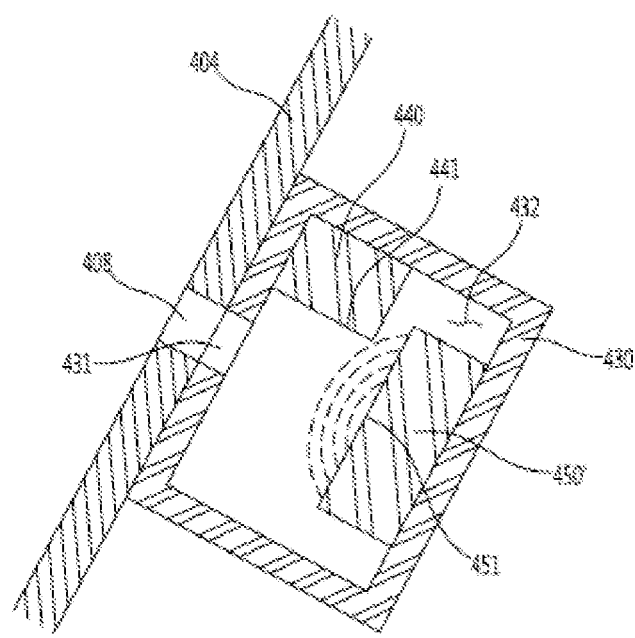
FIG. 13 is a sectional view illustrating still another example of the microphone assembly according to the embodiment.

FIG. 13 is a sectional view illustrating still another example of the microphone assembly according to the embodiment.

The microphone assembly 420 shown in FIG. 13 may be disposed such that the anti-noise speaker 450' faces the opening 431 of the microphone housing 430.

The opening 431 of the microphone housing 420 may be a passage through which the noise of the noise sources 44, 260, and 360 is introduced into the space 432 of the microphone housing 430. When the anti-noise speaker 450' faces the opening 431, an output surface 451 of the anti-noise speaker 450 may face the opening 431.

The microphone assembly 420 shown in FIG. 12 and the microphone assembly 420 shown in FIG. 11 have the same or similar configuration and operation except for the configuration of the anti-noise speaker 450 which faces the opening 431 of the microphone housing 430, so the detailed descriptions thereof will be omitted.

According to the embodiments, the noise input to the input portion of the microphone among the noise generated from the noise source of the robot is canceled, so that the noise input to the microphone can be minimized, and reliability and accuracy of speech recognition or acoustic recognition can be increased.

In addition, one microphone housing may protect the microphone and the anti-noise speaker, so that damages to the microphone and the anti-noise speaker can be minimized with a simple structure.

In addition, the anti-noise output from the anti-noise speaker may cancel the noise introduced from the space of the microphone housing into the input portion of the microphone, so that a high noise reduction effect can be achieved by the anti-noise speaker.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A robot comprising:
a noise source configured to generate a noise;
a microphone assembly to which a voice is input;
an accelerometer connected to the noise source; and
a controller configured to control the microphone assembly,
wherein the microphone assembly includes:
a microphone housing formed in one surface thereof with an opening and formed therein with a space;
a microphone accommodated in the space on one wall of the microphone housing; and
an anti-noise speaker accommodated in the space on another wall of the microphone housing while being spaced apart from the microphone, and
the controller includes an anti-noise generator configured to acquire the noise from the accelerometer and output a signal corresponding to an anti-noise against the acquired noise to the anti-noise speaker,
wherein the controller includes:
a printed circuit board (PCB); and
a signal processor installed on the PCB and including the anti-noise generator, and
wherein the microphone housing, the microphone, and the anti-noise speaker are installed on the PCB.

2. The robot according to claim 1, wherein a gap is formed between the microphone and the anti-noise speaker, and the opening of the microphone housing faces the gap.

3. The robot according to claim 1, wherein the anti-noise speaker is disposed so that one surface of the anti-noise speaker faces the microphone, and
the opening of the microphone housing faces a space between the one surface of the anti-noise speaker and an input portion of the microphone.

4. The robot according to claim 1, wherein the accelerometer is connected to the controller through a signal line.

5. The robot according to claim 1, further comprising an outer cover configured to cover one surface of the PCB and having a microphone hole,
wherein the microphone assembly is installed on a surface opposed to the one surface of the PCB, and
the PCB has a PCB hole facing each of the opening of the microphone housing and the microphone hole of the outer cover.

6. The robot according to claim 5, wherein the microphone housing covers the PCB hole on an opposite side of the outer cover.

7. A robot comprising:
a speaker;
an outer body constituting an exterior and having a microphone hole;
a driver configured to perform a motion of the outer body;
a microphone assembly to which a voice is input;
an accelerometer connected to at least one of the speaker or the driver; and
a controller configured to control the microphone assembly,
wherein the microphone assembly includes:
a microphone housing formed in one surface thereof with an opening and formed therein with a space;
a microphone accommodated in the space on one wall of the microphone housing; and
an anti-noise speaker accommodated in the space on another wall of the microphone housing while being spaced apart from the microphone, and
the controller includes an anti-noise generator configured to acquire a noise from the accelerometer and output a signal corresponding to an anti-noise against the acquired noise to the anti-noise speaker,
wherein the controller includes:
a printed circuit board (PCB); and
a signal processor installed on the PCB and including the anti-noise generator, and
wherein the microphone housing, the microphone, and the anti-noise speaker are installed on the PCB.

8. The robot according to claim 7, wherein the accelerometer is connected to the controller through a signal line.

9. The robot according to claim 7, wherein the outer body includes an outer cover configured to cover one surface of the PCB and having the microphone hole,
the microphone assembly is installed on a surface opposed to the one surface of the PCB, and the PCB has a PCB hole facing each of the opening of the microphone housing and the microphone hole of the outer cover.

10. The robot according to claim 9, wherein the microphone housing covers the PCB hole on an opposite side of the outer cover.

11. A robot comprising:
a base;
a spin body rotatably disposed on the base;
a spin mechanism coupled to the spin body to rotate the spin body;
an outer body having a microphone hole;
a tilting mechanism configured to tilt the outer body about a tilting axis;
a microphone assembly to which a voice is input;
an accelerometer connected to at least one of the spin mechanism or the tilting mechanism; and
a controller configured to control the microphone assembly,
wherein the microphone assembly includes:
   a microphone housing formed in one surface thereof with an opening and formed therein with a space;
   a microphone accommodated in the space on one wall of the microphone housing; and
   an anti-noise speaker accommodated in the space on another wall of the microphone housing while being spaced apart from the microphone, and
the controller includes an anti-noise generator configured to acquire a noise from the accelerometer and output a signal corresponding to an anti-noise against the acquired noise to the anti-noise speaker,
wherein the controller includes:
   a printed circuit board (PCB); and
   a signal processer installed on the PCB and including the anti-noise generator.
wherein the microphone housing, the microphone, and the anti-noise speaker are installed on the PCB.

12. The robot according to claim 11, wherein the outer body includes an outer cover configured to cover one surface of the PCB and having the microphone hole,
   the microphone assembly is installed on a surface opposed to the one surface of the PCB, and
   the PCB has a PCB hole facing each of the opening of the microphone housing and the microphone hole of the outer cover.

13. The robot according to claim 12, wherein the microphone housing covers the PCB hole on an opposite side of the outer cover.

* * * * *